(12) United States Patent
Zhou et al.

(10) Patent No.: US 12,410,743 B2
(45) Date of Patent: Sep. 9, 2025

(54) PRECOMBUSTION CHAMBER IGNITER AND COLD START CONTROL METHOD FOR METHANOL ENGINE

(71) Applicant: Tianjin University, Tianjin (CN)

(72) Inventors: Lei Zhou, Tianjin (CN); Zongkuan Liu, Tianjin (CN); Lijia Zhong, Tianjin (CN); Haiqiao Wei, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/825,364

(22) Filed: Sep. 5, 2024

(65) Prior Publication Data

US 2025/0146435 A1    May 8, 2025

(51) Int. Cl.
  *F02B 19/00*    (2006.01)
  *F02B 19/10*    (2006.01)
  *F02B 19/12*    (2006.01)
  *F02D 41/06*    (2006.01)
  *F02N 19/06*    (2010.01)

(52) U.S. Cl.
  CPC ............ *F02B 19/12* (2013.01); *F02B 19/108* (2013.01); *F02D 41/064* (2013.01); *F02N 19/06* (2013.01)

(58) Field of Classification Search
  CPC .... F02B 19/12; F02B 19/108; F02B 19/1085; F02B 19/18; F02B 19/1023; F02B 19/10; F02P 13/00; F02P 5/045; F02F 1/242

USPC .......................................................... 123/253
See application file for complete search history.

(56) References Cited

U.S. PATENT DOCUMENTS

| | | | |
|---|---|---|---|
| 11,111,848 B1 * | 9/2021 | Bergeron | F02B 55/08 |
| 11,408,329 B2 * | 8/2022 | Schock | F02M 31/042 |
| 12,110,818 B2 * | 10/2024 | Robinson | F02B 19/108 |
| 2017/0328274 A1 * | 11/2017 | Schulz | F02B 19/12 |
| 2022/0112834 A1 * | 4/2022 | Cambal | F02B 19/08 |

* cited by examiner

*Primary Examiner* — Logan M Kraft
*Assistant Examiner* — James J Kim
(74) *Attorney, Agent, or Firm* — Blueshift IP; Robert Plotkin

(57) ABSTRACT

A precombustion chamber igniter with a retractable electric glow plug and a cold start control method for a methanol engine are provided. The precombustion chamber igniter includes a fuel injector, a spark plug, and an electric glow plug. The electric glow plug is retractable and has two working positions, at a first position, a heating segment is wholly located in an injection chamber to provide heat energy for the injection chamber, and at a second position, the heating segment is partially located in the injection chamber and passes through a first through hole, and the rest of the heating segment is located in a main combustion chamber of an engine, to provide heat energy for the injection chamber and the main combustion chamber. In a cold start stage of the engine, the heating segment of the electric glow plug is controlled to be located at the second position.

9 Claims, 3 Drawing Sheets

PRECOMBUSTION CHAMBER IGNITER AND COLD START CONTROL METHOD FOR METHANOL ENGINE

CROSS-REFERENCE TO RELATED APPLICATION

This patent application claims the benefit and priority of Chinese Patent Application No. 202311476477.2 filed with the China National Intellectual Property Administration on Nov. 8, 2023, the disclosure of which is incorporated by reference herein in its entirety as part of the present application.

TECHNICAL FIELD

The present disclosure belongs to the technical field of internal combustion engines, and in particular refers to a precombustion chamber igniter with a retractable electric glow plug, and a cold start control method for a methanol engine.

BACKGROUND

With increasing concern of people about fuel shortage and air pollution control, many traditional automobile companies vigorously develop new energy vehicles. However, with the transformation and upgrading of the automobile industry from high-speed development to high-quality development, new energy vehicles are faced with policy and technical problems such as high cost of power batteries, slow charging time, short endurance of vehicles, and insufficient safety and reliability. Therefore, in order to reduce the dependence of traditional internal combustion engines on fossil fuels, there is an urgent need to develop novel clean alternative fuels.

As the boiling point of methanol (338 K) is higher than the initial boiling point of gasoline (about 313 K), and the methanol has the properties of low vapor pressure and high latent heat of vaporization, when the engine is started, the heat absorbed by methanol fuel is about 8.07 times that of gasoline, and the amount of evaporation of the methanol is only ¼ of that of gasoline; moreover, the amount of evaporation is greatly affected by the temperature, and the amount of evaporation at 7° C. is only ⅙ of that at 20° C. The high latent heat of vaporization of methanol and insufficient amount of evaporation directly lead to a situation that the concentration of the methanol mixture in the main combustion chamber cannot meet the ignition requirements of the engine, directly resulting in the problem that the methanol-fueled spark-ignition (SI) engine is difficult to start at a low ambient temperature.

During the cold start of methanol engine, due to the low ambient temperature, the gas intake temperature and engine body temperature are low, and minimal fuel oil evaporates to enter the main combustion chamber. The preparation of gas mixture in the first few cycles is significantly important for the engine with port fuel injection, which makes it more difficult for the methanol SI engine to achieve cold start at low temperature than a gasoline engine. Moreover, the failure of cold start means a large number of misfire cycles, which will produce a large number of CO, HC and unburned methanol emissions, causing serious pollution to the environment.

Therefore, there is a need of a device to solve the start difficulty of the methanol engine during the cold start, to strengthen the degree of mixing of the fuel oil in the main combustion chamber and the thermodynamic conditions in the cylinder under cold start conditions, and to improve the reactivity of a working medium in the main combustion chamber.

SUMMARY

An objective of the present disclosure is to provide a precombustion chamber igniter with a retractable electric glow plug and a cold start control method for a methanol engine. According to the present disclosure, the precombustion chamber igniter is designed as a structure that a precombustion chamber may be heated, and an angle of fuel injection is designed. The start difficulty of the methanol engine under a cold start condition and an emission problem caused by the cold start are solved by using three effects of a jet flame on a working fluid in a cylinder, i.e., improving initial thermodynamic conditions, increasing the turbulence intensity and improving the reactivity of the working fluid. The thermodynamic conditions and the turbulence intensity in the main combustion chamber are improved, the gas mixture in the main combustion chamber can be ignited and fully burned, and thus the methanol engine can operate under conditions closer to stoichiometric ratio during cold start, that is, the engine can be started stably without generating excessive emission pollutants.

The objective of the present disclosure is achieved through the following technical solution:

A precombustion chamber igniter with a retractable electric glow plug includes a housing, a fuel injector, a spark plug, and an electric glow plug. The fuel injector, the spark plug and the electric glow plug are arranged in the housing, and a nozzle of the fuel injector and an electrode of the spark plug extend into an injection chamber.

The fuel injector is configured to inject fuel into the injection chamber to form a target gas mixture.

The bottom of the housing is provided with multiple jet holes 1 and a first through hole in a penetrating manner, and the jet holes 1 are arranged around the first through hole.

The electric glow plug includes a retractable device and a heating segment located at a lower part of the electric glow plug, and the heating segment may have two working positions under the control of the retractable device, which are a first position and a second position. The first position is that the heating segment is wholly located in the injection chamber to provide heat energy for the injection chamber, and the second position is that the heating segment is partially located in the injection chamber and passes through the first through hole, while a rest of the heating segment is located in a main combustion chamber of an engine, to provide heat energy for both the injection chamber and the main combustion chamber. A sidewall profile of the heating segment is in fit with a profile of the first through hole.

Further, the housing includes a first housing and a second housing which are detachably connected, and the first housing and the second housing are assembled to form the injection chamber. A part of a sidewall of the first housing and a sidewall of the second housing are both provided with threads to be threaded to a cylinder cover of the engine.

Further, the electric glow plug is installed at the center of the housing, the spark plug and the fuel injector are respectively located on both sides of the electric glow plug, and a central axis of the electrode of the spark plug and a central axis of an injection port of the fuel injector form an included angle of 30°-60°. The ignition limit of a methanol-gas mixture in the precombustion chamber can be improved by arranging the electric glow plug in the middle of the housing, and meanwhile, the ignition energy can be improved by ejecting a high-temperature gas or flame from the precombustion chamber. Moreover, the high-temperature gas can improve the thermodynamic temperature and pressure of the whole combustion chamber, thus improving the ignition limit and ignition ability of the gas mixture in the main combustion chamber.

Further, a diameter of each jet hole is 3-6 mm, and the jet holes includes 3 to 6 jet holes, so as to ensure that a communication space of the precombustion chamber and the main combustion chamber is sufficient.

A cold start control method for a methanol engine using the precombustion chamber igniter includes a methanol engine. The methanol engine includes the precombustion chamber igniter, a cylinder cover, a substrate, a gas intake end, a gas outlet end, and a push rod arranged in the substrate.

In a cold start stage of the engine, a heating segment of an electric glow plug is controlled to pass through the first through hole and thereby to be located at a second position, in which gas mixtures in an injection chamber and a main combustion chamber are heated simultaneously.

After a temperature in the injection chamber reaches a preset working temperature, the engine drives a push rod to move upwards to a compression top dead center, the methanol is injected by the fuel injector, and an excess gas coefficient inside the injection chamber is controlled between 0.8 and 1.0. The fuel quickly evaporates after making contact with a heated inner wall of the injection chamber, and then is mixed with air to form a combustible mixture, and the gas mixture in the injection chamber is ignited by a spark plug at an optimal ignition angle to form a jet flame to enter the main combustion chamber. The fuel injection amount from the fuel injector is determined according to the volume of the injection chamber, and the optimal ignition angle is determined by an operating state of the engine.

After the methanol engine operates stably, the fuel injector and the spark plug continue to work, and the electric glow plug does not work, the heating segment of the electric glow plug is restored to a first position, i.e., retracting the heating segment into the injection chamber.

Further, the volume of the injection chamber of the precombustion chamber igniter is less than 5% of the volume of the main combustion chamber.

The model, size and length of the electric glow plug extending into the main combustion chamber may be set according to the model and operating conditions of the engine.

Compared with the prior art, the present disclosure has beneficial effects as follows:

1. Compared with the traditional enrichment cold start mode, the engine with the precombustion chamber igniter of the present disclosure is adopted, in the cold start stage, a small amount of methanol can be injected into the precombustion chamber by the fuel injector and ignited in the injection chamber, and thus the total amount of injected fuel can be reduced, and the consumption of the fuel can be reduced. Moreover, due to sufficient burning in the cylinder, ultra-lean combustion of the engine in the cold start state of the engine can be achieved, and the emissions of HC and CO can be remarkably reduced.

2. Due to the small volume of the injection chamber (precombustion chamber), compared with the traditional mode of heating the whole main combustion chamber, the method for heating the injection chamber (precombustion chamber) has faster heating speed, less energy consumption and excellent ignition performance of cold start. Moreover, compared with the cold start mode of gas intake heating, the requirement for electric energy consumption is reduced, and the method provided by the present disclosure is more stable and reliable.

3. The electric glow plug is in a retractable form, and thus can heat the injection chamber and the main combustion chamber simultaneously in the cold start stage, and improve a thermodynamic state in the main combustion chamber. The heating segment of the electric glow plug retracts into the injection chamber after the cold start, so as to reduce the failure rate. Moreover, the second housing at the jet holes of the precombustion chamber igniter and the first housing are detachable to facilitate replacement.

4. The ignition limit of a methanol-gas mixture in the precombustion chamber can be improved by arranging the electric glow plug in the middle of the housing, and the ignition energy can be improved by ejecting a high-temperature gas or flame from the precombustion chamber. Moreover, the high-temperature gas can improve the thermodynamic temperature and pressure of the whole combustion chamber, thus improving the ignition limit and ignition ability of the gas mixture in the main combustion chamber.

Figure 1:
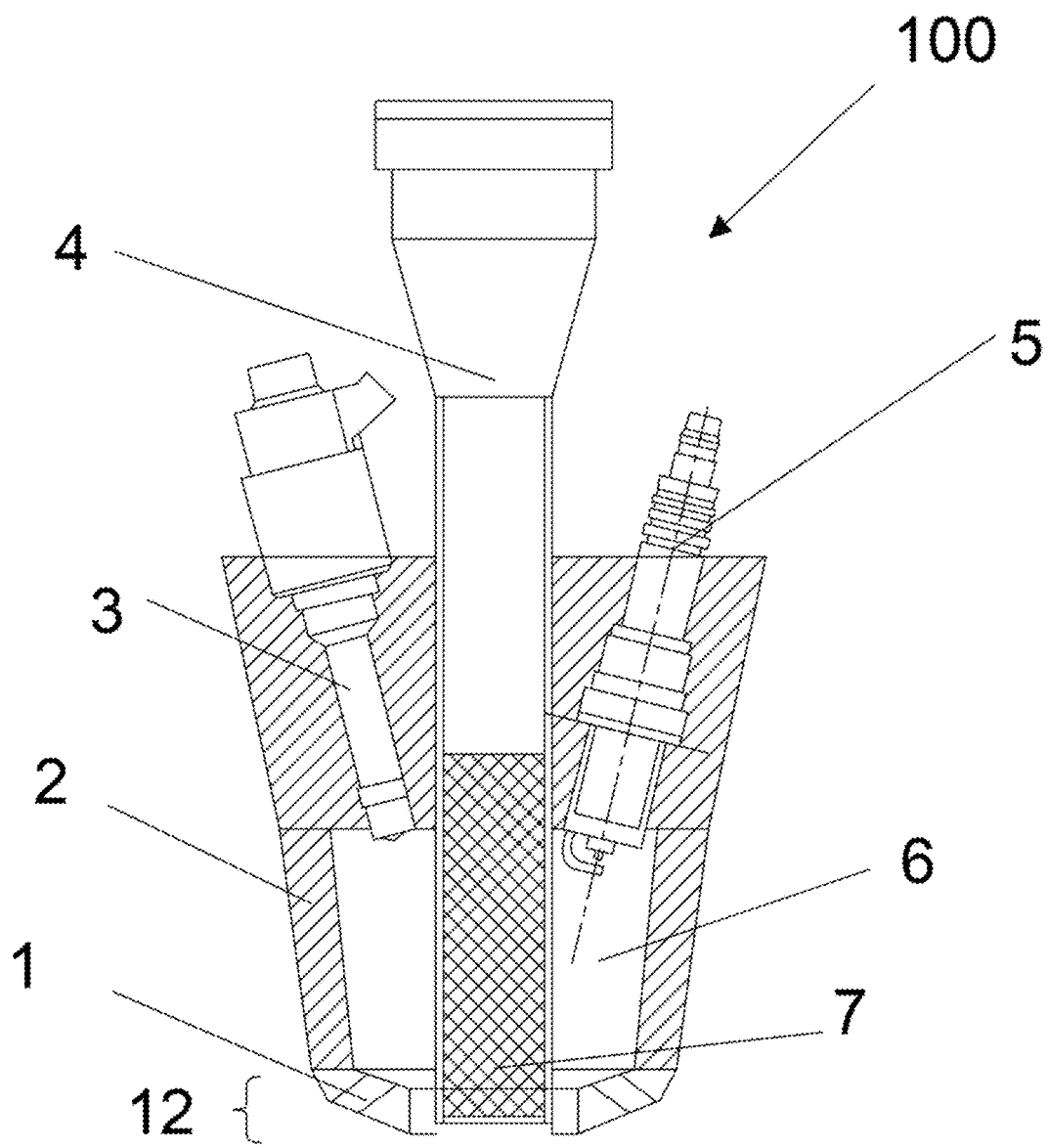
FIG. 1 is a section view of a precombustion chamber igniter according to the present disclosure, wherein a heating segment is located in an injection chamber of a precombustion chamber, i.e., at a first position.

In the drawings:
100—precombustion chamber igniter; 1—jet hole; 2—first housing; 3—fuel injector; 4—electric glow plug; 5—spark plug; 6—injection chamber; 7—heating segment; 8—substrate; 9—gas intake end; 91—gas intake pipe; 92—gas intake valve; 10—gas outlet end; 101—gas outlet pipe; 102—gas outlet valve; 11—push rod; 12—second housing.

DETAILED DESCRIPTION OF THE EMBODIMENTS

To make the objectives, technical solutions, beneficial effects and remarkable developments of the present disclosure more clearly, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In the present disclosure, it should be noted that, unless expressly specified and limited otherwise, the terms "first", "second" and "third" are used for descriptive purposes only and cannot be construed as indicating or implying relative importance. The term "a plurality of" refers to two or more. Unless otherwise specified or specified, the terms "connection" and "fixed" should be broadly understood. For example, "connection" may be a fixed connection, a detachable connection, an integral connection, or an electrical connection, and "connection" may also be direct connection, or indirect connection through an intermediary. For those of ordinary skill in the art, the specific meanings of the above terms in the utility model can be understood on a case-by-case basis.

Figure 2:
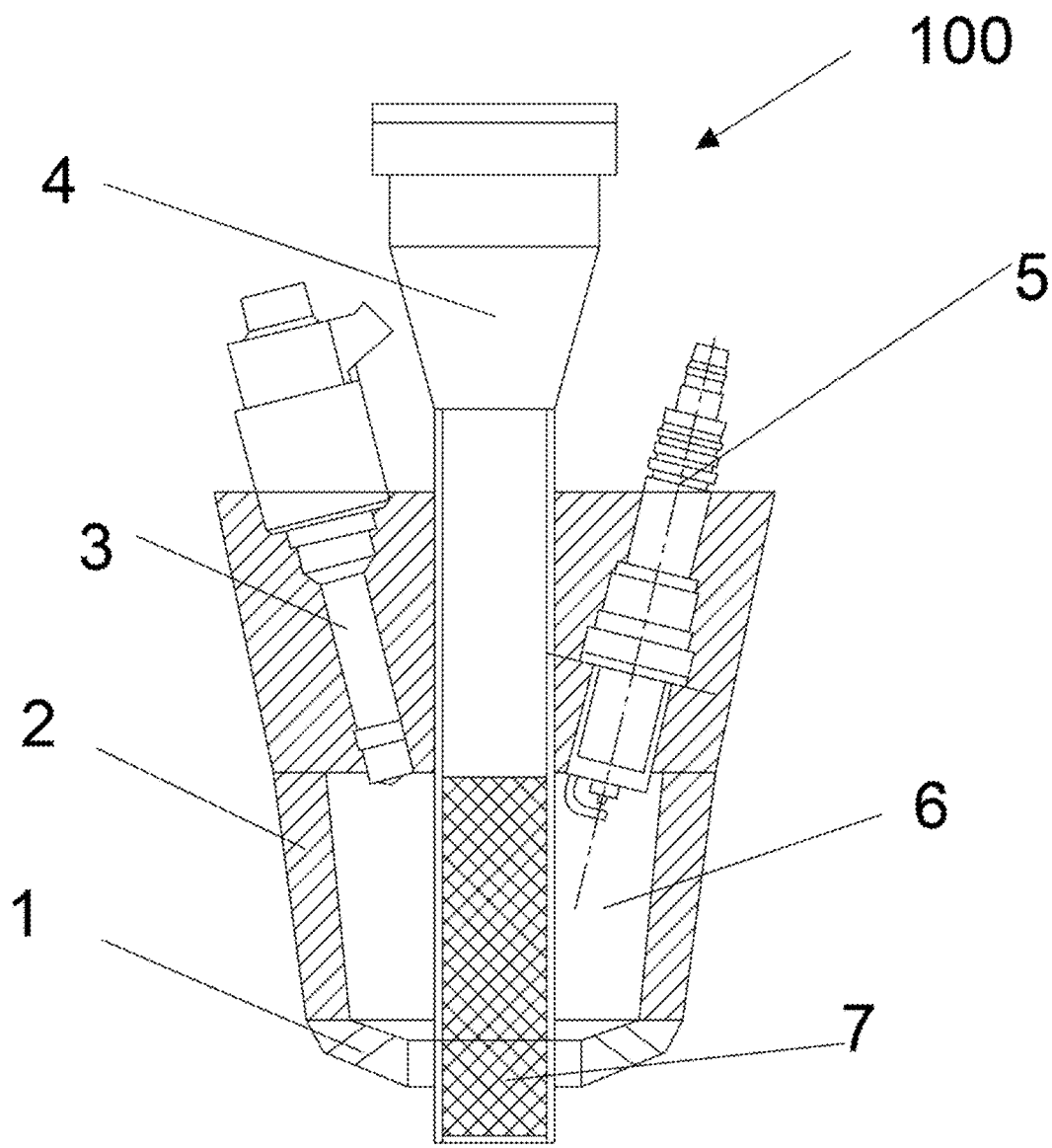
FIG. 2 is a section view of a precombustion chamber igniter according to the present disclosure, wherein a heating segment is located in an injection chamber of a precombustion chamber and a main combustion chamber, i.e., at a second position.

As shown in FIG. 1, a precombustion chamber igniter 100 includes a housing, a fuel injector 3, a spark plug 5, and an electric glow plug 4. The housing includes a first housing 2, and a second housing 12. The first housing 2 is threadedly connected to the second housing 12 to form an injection chamber 6. The injection chamber 6 herein plays a role of a precombustion chamber. The fuel injector 3, the spark plug 5 and the electric glow plug 4 are arranged in the first housing 2, the electric glow plug 4 is located at the center of the first housing 2, a nozzle of the fuel injector 3 and an electrode of the spark plug 5 extend into the injection chamber 6, and the electrode of the spark plug 5 is provided corresponding to an injection port of the fuel injector 3, that is, a central axis of the electrode of the spark plug 5 and a central axis of the injection port of the fuel injector 3 form an angle of 60°. The fuel injector 3 is configured to inject methanol fuel into the injection chamber 6 to form a target gas mixture in the injection chamber 6. The second housing 12 is provided with six jet holes 1 and a first through hole in a penetrating manner. The first through hole is located at the center of the bottom of the second housing 12, the jet holes 1 are arranged around the first through hole, and each jet hole 1 has a diameter of 3 mm. According to such a structural design of the embodiment of the present disclosure, the jet flame ejected from the jet holes 1 can uniformly cover the whole main combustion chamber to successfully ignite the gas mixture in the main combustion chamber, making the fuel sufficiently burned. The injection chamber 6 communicates with the main combustion chamber of the engine through the jet holes 1. The electric glow plug 4 is arranged in the middle and vertically penetrates the injection chamber 6 of the precombustion chamber igniter 100. The electric glow plug 4 includes a retractable device, and a heating segment 7 (a grid part at the lower part of the electric glow plug 4 in FIG. 1) located at a lower part of the electric glow plug. Specifically, the retractable device is an electric lead screw (controlled by an ECU (Electronic control unit)), a tail end of the retractable device is connected to the top of the heating segment 7, the bottom of the heating segment 7 is a free end, and the extension and retraction of the heating segment can be controlled by controlling the retractable device. The electric glow plug 4 has two working positions, which are a first position and a second position. The first position is located in the injection chamber (shown in FIG. 1), the second position (as shown in FIG. 2) penetrates through the first through hole, the heating segment 7 is partially located in the injection chamber, and the rest of the heating segment is located in the main combustion chamber of the engine, such that the heating segment 7 located in the injection chamber, or pass through the injection chamber and pass through the first through hole to downwards extend into the main combustion chamber of the engine. Moreover, a hole profile of the first through hole is in fit with an outer profile of the heating segment 7 at the lower part of the electric glow plug 4, and thus the electric glow plug 4 can directly pass through the first through hole.

Figure 3:
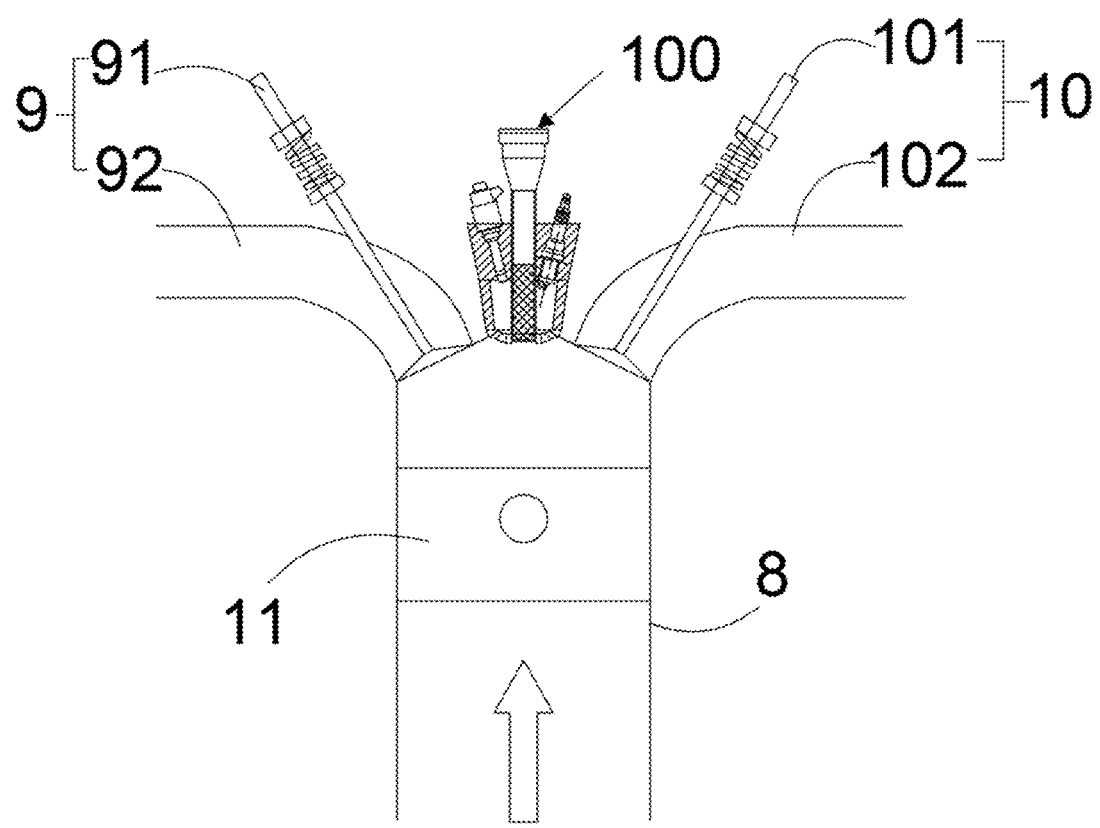
FIG. 3 is a structural schematic diagram of a methanol engine installed with a precombustion chamber igniter.

As shown in FIG. 3, a methanol engine includes a precombustion chamber igniter 100, a cylinder cover, a substrate 8, a gas intake end 9, a gas outlet end 10, and a push rod 11 movably installed in the substrate 8. The precombustion chamber igniter 100, the gas intake end 9 and the gas outlet end 10 are all arranged at the top of the cylinder cover, and the gas intake end 9 and the gas outlet end 10 are located on both sides of the precombustion chamber igniter 100, respectively. A movable chamber is formed in the substrate 8 and the cylinder cover, the push rod 11 is abutted against an inner wall of the movable chamber, and the volume of the injection chamber 6 of the precombustion chamber igniter 100 is less than 5% of the volume of the main combustion chamber, so as to ensure that an existing ignition-type engine for vehicle can be used without major changes. The gas intake end 9 includes a gas intake pipe 91 and a gas intake valve 92 for introducing a gas, and the gas outlet end 10 includes a gas outlet pipe 101 and a gas outlet valve 102 for exhausting the gas.

When installing the precombustion chamber igniter 100, the fuel injector 3, the electric glow plug 4 and the spark plug 5 are firstly installed on the first housing 2. A part of a sidewall of the first housing 2 (close to the second housing) and one end of the second housing 12 are both provided with threads, and then the precombustion chamber igniter 100 is installed on the substrate 8 by the threads on the sidewall of the second housing 12. Such a structure design enhances the connection firmness between the first housing 2 and the second housing 12. When the jet holes 1 of the precombustion chamber on the second housing 12 are damaged, the second housing 12 can be rapidly and conveniently replaced, and the replacement efficiency is improved. In the embodiment of the present disclosure, the fuel injector 3 is a single-hole fuel injector, and has an injection direction towards a direction of the spark plug 5, as shown in FIG. 1.

An ignition control method for the methanol engine in a cold start working condition is as follows:

In a cold start working condition: the heating segment 7 at the lower part of the electric glow plug 4 is controlled to penetrate through the injection chamber 6, then extend into the main combustion chamber (i.e., at the second position, shown in FIG. 2), and is configured to heat the gas mixtures in the injection chamber 6 and the main combustion chamber simultaneously, thus promoting good atomization and evaporation of fuel gas mixtures in the injection chamber 6 and the main combustion chamber. After a temperature in the injection chamber 6 reaches a preset working temperature, an engine crankshaft drives the push rod 11 to move upwards to a compression top dead center, that is, before 180° CA (specifically calibrated according to different engine parameters). A small amount of methanol is injected by the fuel injector 3, quickly evaporates in a high-temperature environment in the injection chamber 6, is mixed with air to form a combustible mixture, and then is ignited by the spark plug 5 (an optimal ignition angle is determined by an operating state of the engine) to form jet flame and high-temperature products to enter the main combustion chamber, so as to ensure the stable start of the engine. The injection amount of the fuel needs to be determined according to the volume of the injection chamber 6, and an excess air coefficient in the injection chamber 6 is controlled between 0.8 and 1.0.

Afterwards, the gas mixture (as shown in FIG. 3) in the injection chamber 6 is ignited by the spark plug 5, the interior of the injection chamber 6 is firstly ignited, and then multiple jet flames are ejected by accelerating through the jet holes 1 to ignite the gas mixture in the main combustion chamber. As the gas mixture in the main combustion chamber is heated, the temperature is increased, which is beneficial to sufficient burning, and finally the methanol engine can achieve reliable cold start.

In a stable operating condition of the engine: after the cold start is finished, the engine is in a normal working state, and only fuel injector 3 and spark plug 5 work at this time, the electric glow plug 4 does not work, and the heating segment 7 of the electric glow plug 4 retracts into the injection chamber 6, i.e., at the first position (as shown in FIG. 1), to prevent the electric glow plug from being burned in the normal combustion process of the engine. Therefore, the reliability of the engine is improved, and the fault rate is reduced.

It should be noted that the model, the size and length of the electric glow plug extending into the main combustion chamber can be set according to the model and operating condition of the engine.

Moreover, the precombustion chamber igniter of the present disclosure may be applied to the cold start problem of the engines fueled by other fuels with high latent heat of vaporization or liquid ammonia fuel.

In addition, it should be noted that although the specification is described in terms of embodiments, every embodiment does not merely include an independent technical solution. This narration in the specification is only for clarity. Those skilled in the art should regard the specification as a whole, and the technical solutions in each embodiment may also be combined as appropriate to form other embodiments that can be understood by those skilled in the art.

What is claimed is:

1. A precombustion chamber igniter, comprising a housing, a fuel injector (3), a spark plug (5), and an electric glow plug (4), wherein the fuel injector (3), the spark plug (5) and the electric glow plug (4) are arranged in the housing, and a nozzle of the fuel injector (3) and an electrode of the spark plug (5) extend into an injection chamber (6);
   the fuel injector (3) is configured to inject fuel into the injection chamber (6) to form a target gas mixture;
   a bottom of the housing is provided with a plurality of jet holes (1) and a first through hole in a penetrating manner, and the jet holes (1) are arranged around the first through hole;
   the electric glow plug (4) comprises a retractable device and a heating segment (7) located at a lower part of the electric glow plug, the heating segment (7) is able to have two working positions under a control of the retractable device, which are a first position and a second position; at the first position, the heating segment (7) is wholly located in the injection chamber to provide heat energy for the injection chamber (6), and at the second position, the heating segment is partially located in the injection chamber and passes through the first through hole, while a rest of the heating segment is located in a main combustion chamber of an engine, to provide heat energy for both the injection chamber (6) and the main combustion chamber; and a sidewall profile of the heating segment (7) is in fit with a profile of the first through hole.

2. The precombustion chamber igniter according to claim 1, wherein the housing comprises a first housing (2) and a second housing (12) which are detachably connected to each other, and the first housing (2) and the second housing (12) are assembled to form the injection chamber (6); and a part of a sidewall of the first housing and a sidewall of the second housing are both provided with threads to be threaded to a cylinder cover of the engine.

3. The precombustion chamber igniter according to claim 1, wherein the electric glow plug (4) is installed at a center of the housing, the spark plug and the fuel injector are respectively located on both sides of the electric glow plug, and a central axis of the electrode of the spark plug (5) and a central axis of an injection port of the fuel injector (3) form an included angle of 30°-60°.

4. The precombustion chamber igniter according to claim 1, wherein the jet holes (1) each have a diameter of 3-6 mm, and the jet holes comprises 3 to 6 jet holes.

5. A cold start control method for a methanol engine, wherein the methanol engine comprises the precombustion chamber igniter (100) according to claim 1;
   in a cold start stage of the engine, controlling the heating segment (7) of the electric glow plug to pass through the first through hole and thereby to be located at the second position, in which gas mixtures in the injection chamber (6) and the main combustion chamber are heated simultaneously;
   after a temperature in the injection chamber (6) reaches a preset working temperature, driving, by the engine, a push rod (11) to move upwards to a compression top dead center, injecting, by the fuel injector (3), methanol into the injection chamber (6), controlling an excess air coefficient inside the injection chamber (6) between 0.8 and 1.0, wherein the fuel quickly evaporates after making contact with a heated inner wall of the injection chamber (6) and then is mixed with air to form a combustible mixture; and igniting the gas mixture in the injection chamber (6) by a spark plug at an optimal ignition angle to form a jet flame to enter the main combustion chamber, wherein a fuel injection amount from the fuel injector is determined according to a volume of the injection chamber (6), and the optimal ignition angle is determined by an operating state of the engine; and
   after the methanol engine operates stably, enabling the fuel injector (3) and the spark plug (5) to continue to work and the electric glow plug not to work, and restoring the heating segment (7) of the electric glow plug (4) to the first position, i.e., retracting the heating segment (7) into the injection chamber (6).

6. The cold start control method for a methanol engine according to claim 5, wherein a volume of the injection chamber (6) of the precombustion chamber igniter (100) is less than 5% of a volume of the main combustion chamber.

7. The cold start control method for a methanol engine according to claim 5, wherein the housing comprises a first housing (2) and a second housing (12) which are detachably connected to each other, and the first housing (2) and the second housing (12) are assembled to form the injection chamber (6); and a part of a sidewall of the first housing and a sidewall of the second housing are both provided with threads to be threaded to a cylinder cover of the engine.

8. The cold start control method for a methanol engine according to claim 5, wherein the electric glow plug (4) is installed at a center of the housing, the spark plug and the fuel injector are respectively located on both sides of the electric glow plug, and a central axis of the electrode of the spark plug (5) and a central axis of an injection port of the fuel injector (3) form an included angle of 30°-60°.

9. The cold start control method for a methanol engine according to claim 5, wherein the jet holes (1) each have a diameter of 3-6 mm, and the jet holes comprises 3 to 6 jet holes.

* * * * *